United States Patent
Jones et al.

(10) Patent No.: US 12,441,228 B1
(45) Date of Patent: Oct. 14, 2025

(54) TRAILER FOR WORKING LIVESTOCK

(71) Applicant: J-CO CATTLE HAND, LLC, Graham, TX (US)

(72) Inventors: Charles Jones, Graham, TX (US); Mitch Jones, Graham, TX (US)

( * ) Notice: Subject to any disclaimer, the term of this patent is extended or adjusted under 35 U.S.C. 154(b) by 24 days.

(21) Appl. No.: 17/953,534

(22) Filed: Sep. 27, 2022

Related U.S. Application Data (60) Provisional application No. 63/248,587, filed on Sep. 27, 2021.

(51) Int. Cl.
*B60P 3/04* (2006.01)
*A01K 1/02* (2006.01)

(52) U.S. Cl.
CPC .............. *B60P 3/04* (2013.01); *A01K 1/0272* (2013.01)

(58) Field of Classification Search
CPC .. A01K 1/0035; A01K 1/0272; A01K 1/0236; B60P 3/04; B61D 3/163
See application file for complete search history.

(56) References Cited

U.S. PATENT DOCUMENTS

| | | | | |
|---|---|---|---|---|
| 3,824,958 | A * | 7/1974 | Parady, Jr. ........... | A01K 1/0236 119/410 |
| 4,092,044 | A * | 5/1978 | Hoffman .................... | B60P 3/04 105/243 |
| 5,174,240 | A * | 12/1992 | Darvill ...................... | B60P 3/04 119/840 |
| 5,769,478 | A * | 6/1998 | Vernese .................... | B60P 3/04 296/181.6 |
| 7,607,874 | B2 * | 10/2009 | Nelson .................. | B61D 17/048 410/140 |
| 2002/0061246 | A1 * | 5/2002 | Bonsall ................... | A01K 15/02 414/537 |
| 2008/0131226 | A1 * | 6/2008 | Pesson ................... | B61D 45/00 410/129 |
| 2010/0066041 | A1 * | 3/2010 | Metzger .................... | B60P 1/00 280/6.153 |
| 2010/0300373 | A1 * | 12/2010 | Kell ......................... | B60P 3/04 119/512 |

FOREIGN PATENT DOCUMENTS

| | | | | | |
|---|---|---|---|---|---|
| CA | 3038168 | A1 * | 2/2019 | ............. | A01K 67/00 |
| CA | 3063407 | A1 * | 6/2023 | ........... | A01K 1/0035 |
| DE | 3907016 | A1 * | 9/1990 | ................ | B60P 3/04 |
| DE | 20017683 | U1 * | 1/2001 | ................ | B60P 3/04 |
| DE | 202015101065 | U1 * | 7/2016 | ................ | B60P 3/04 |
| FR | 2536360 | A1 * | 5/1984 | ................ | B60P 3/04 |
| WO | WO-2012018793 | A2 * | 2/2012 | ........... | A01K 1/0052 |

OTHER PUBLICATIONS

US Cargo Control (Screen captures from YouTube video clip entitled "How to Install E-Track on a Flatbed Trailer | How to Install E-Track on Trailer Floor", 1 page, uploaded Aug. 3, 2011 by user US Cargo Control. Retrieved from Internet <https://www.youtube.com/watch?v=JrWXkJVW5VM&t=47s>) (Year: 2011).*

* cited by examiner

*Primary Examiner* — Peter M Poon
*Assistant Examiner* — Carly W. Lynch
(74) *Attorney, Agent, or Firm* — James E. Walton (57) ABSTRACT

A trailer for working livestock includes a front wall, a rear wall, a pair of opposing side walls, a front rail system, and a partition system having a support pole, a movable partition, and a track system. The movable partition is movable across the trailer relative to both the front rail system and the opposing side walls.

20 Claims, 13 Drawing Sheets

TRAILER FOR WORKING LIVESTOCK

The present application claims the benefit of U.S. Provisional Patent Application No. 63/248,587 filed on 27 Sep. 2021, titled "Trailer for Working Livestock," which is incorporated herein for all purposes.

BACKGROUND

1. Field of the Invention

The present application relates to livestock trailers, specifically to a trailer for working livestock.

2. Description of Related Art

Livestock trailers have been around essentially since vehicles have been around. Generally, livestock trailers are designed for transporting livestock from one point to another. Many livestock trailers have exterior doors or gates, configured for entry and exit into the trailer from various points. Some trailers have interior partitions meant for separating livestock within the trailer.

In the field, different systems such as corrals, chutes, and gate systems are used for maneuvering livestock. These systems sometimes include structures like head gates, meant for keeping the livestock in place while the work is being done.

Although great strides have been made in the area of livestock trailers, many shortcomings remain.

BRIEF DESCRIPTION OF THE DRAWINGS

The novel features believed characteristic of the present application are set forth in the appended claims. However, the present application itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
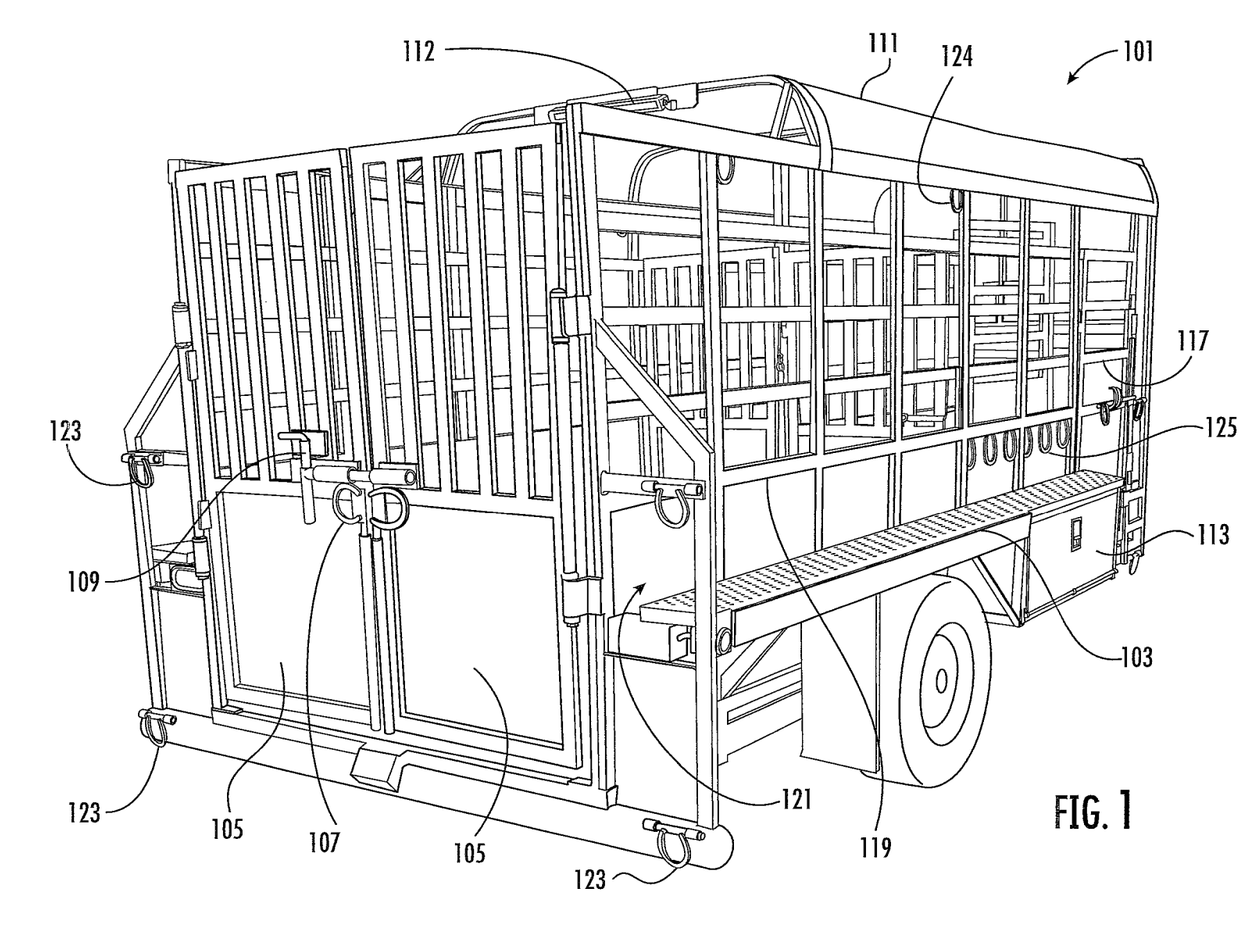
FIG. 1 is a perspective view of a trailer for working livestock according to the present application.
Figure 2:
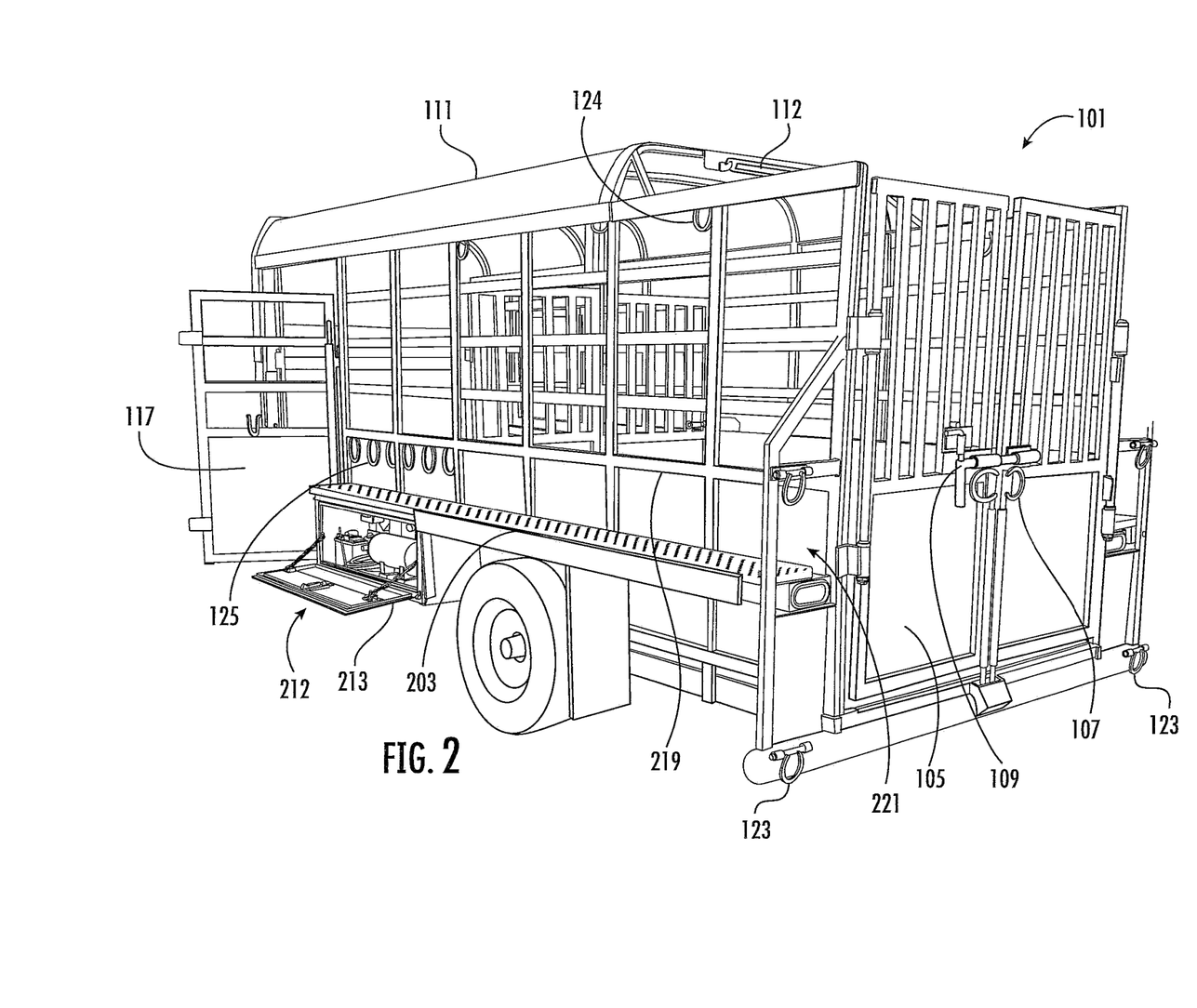
FIG. 2 is another perspective view of the trailer for working livestock of FIG. 1.

Referring now to FIGS. 1 and 2 in the drawings, a preferred embodiment of a trailer for working livestock 101 according to the present application is illustrated. Trailer 101 includes side walls 119 and 219. Side walls 119, 219 may include paneling, such that portions of the interior are not exposed to the exterior, and side walls 119, 219 may include openings, such that the interior of trailer 101 can be seen and accessed from the exterior. Side walls 119, 219 may also include combinations of paneling and openings, such that only portions of the interior may be seen and accessed from the exterior. Trailer 101 also includes one or more side rails 103 and 203. Side rails 103, 203 are preferably configured to be wide enough for a person to stand on. Additionally, side rails 103, 203 are preferably configured with a surface with increased traction for when workers stand on them. For example, side rails 103, 203 may have a surface with corrugated steel, diamond plating, anti-slip tape, or other materials or treatments. It should be appreciated that side rails 103, 203 may have a surface made of another material not mentioned here, if desired.

In the preferred embodiment, a gap 121 is present between side wall 119 and side rail 103. Gap 121 is configured such that equipment, such as fence panels or gates, may be carried on the trailer 101. Likewise, a gap 221, similar to gap 121, may be present between side wall 219 and side rail 203. It will be appreciated that trailer 101 may have additional or fewer gaps 121, 221 if a different configuration is desired.

Trailer 101 is illustrated as being a single axle trailer. However it will be appreciated that multiple variations may exist other than a single axle. For example, trailer 101 may include a tandem axle or other variations of multiple-axle trailers.

Trailer 101 preferably includes two rear doors 105 that are connected to side walls 119, 219. However, the rear portion of trailer 101 may have no door, a single door, or additional doors, depending on the desired size and use of the doors. For example, there could be four smaller doors if the livestock being moved into the trailer are smaller animals. In FIGS. 1 and 2, rear doors 105 are shown as being hinged to side walls 119, 219; however, rear doors 105 may be configured in other ways. For example, a single door may only be hinged on one side, or a roll up type door could be used.

Figure 4:
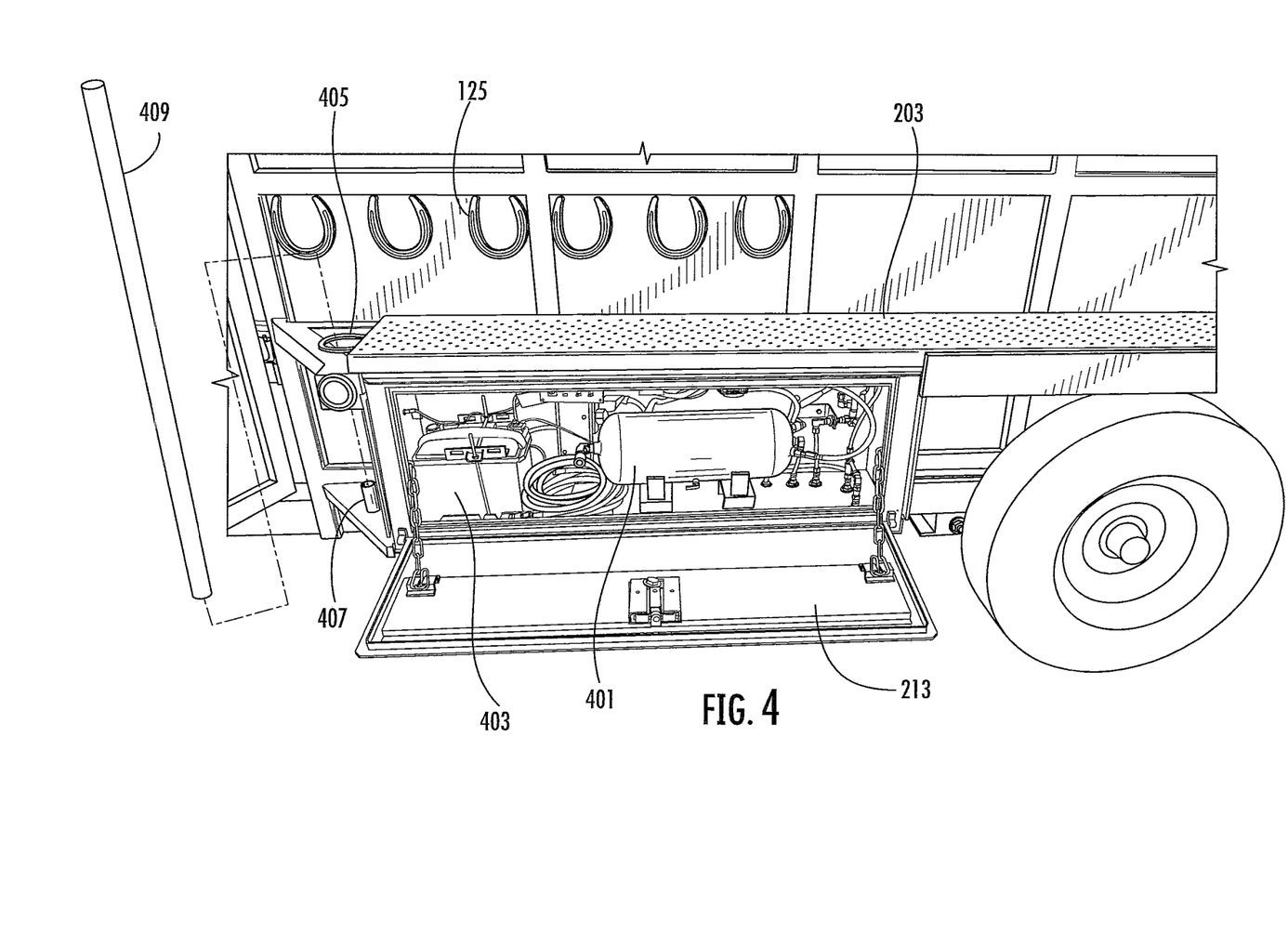
FIG. 4 is a partial perspective view of the trailer for working livestock of FIG. 1.
Figure 5:
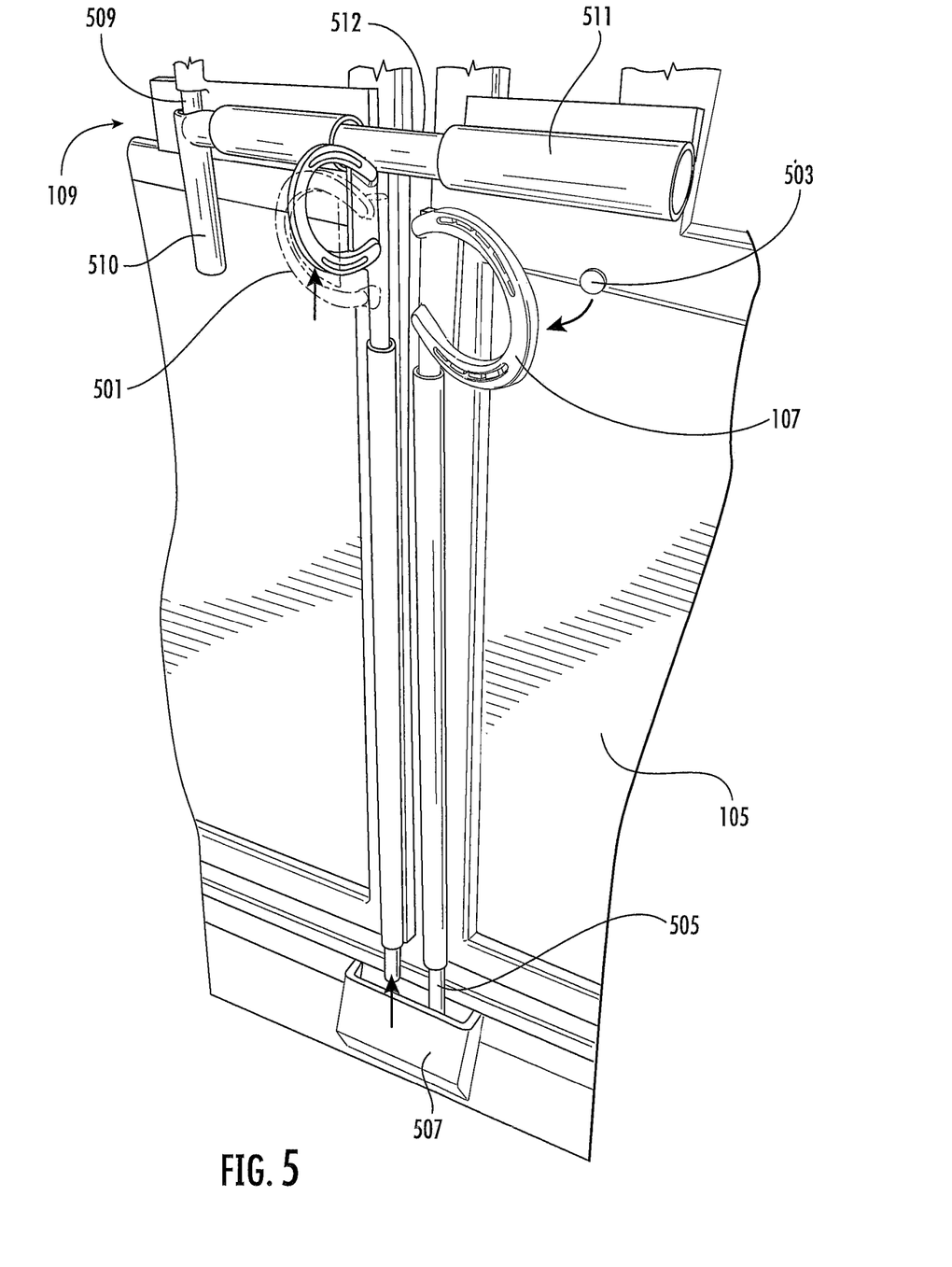
FIG. 5 is a partial perspective view of the trailer for working livestock of FIG. 1.

Rear doors 105 are preferably configured such that rear doors 105 can be secured using a redundant system, such as handles 107 and a latch 109 (see FIG. 5 for more detail). The rear of trailer 101 may have a lift system for raising and lowering at least the rear portion of trailer 101, so that livestock can be more easily loaded into and unloaded from trailer 101. In the preferred embodiment, the lift system is an airbag system 212. Alternatively, the rear of trailer 101 may have a pull out or fold out ramp in place of, or in addition to, airbag system 212. Airbag system 212 is preferably a pneumatic system driven by compressed air (see FIG. 4), but may be other types of lift systems, including electric and/or hydraulic.

Preferably, side walls 119, 219 include one or more side doors 117. FIG. 1 illustrates one side door 117 being closed, and FIG. 2 illustrates one side door 117 being open. It will be appreciated that trailer 101 may include no side doors 117, a single side door 117, or multiple side doors 117 on each side of trailer 101. Trailer 101 is configured so that livestock can be loaded in through rear doors 105 and then removed through side doors 117. This configuration is advantageous because the at the animals do not need to be turned around or maneuvered in other ways while inside trailer 101. In the preferred embodiment, side walls 119, 219 include openings 125 that may be used for controlling movement of the livestock (see also FIG. 15). While the openings 125 are shown as being horseshoe-shaped with six openings on each side wall, it will be appreciated that any number of openings 125 may be included, and that openings 125 may take on a variety of shapes.

In the preferred embodiment, trailer 101 includes one or more storage cabinets 113 and 213, each being disposed on an opposite outer portion of trailer 101. Storage cabinets 113, 213 are shown as being located below openings 125 on each side wall 119, 219 of trailer 101, with side rails 103, 203 continuing above storage cabinets 113, 213, respectively. It will be appreciated that the size, shape, and location of storage cabinets 113, 213 may vary. Additionally, fewer or additional storage cabinets 113, 213 may be used, depending on the desired configuration and use of trailer 101. Storage cabinets 113, 213 may be used to house trailer equipment, such as components of lift system 212, hydraulic units, batteries, or spare parts. Additionally, storage cabinets 113, 213 may be used to store equipment used for tending to and working the livestock in trailer 101.

Trailer 101 may include a roof 111. Roof 111 is shown as being a partial roof, but it should be understood that trailer 101 may have no roof, a full roof, or any size partial roof, so as to cover only certain portions of the interior of trailer 101. Trailer 101 preferably includes one or more lights 112. Although lights 112 have been shown as being a single light strip attached to roof 111, lights 112 may take on various forms other than what is illustrated. For example, multiple strips of lights or individual bulbs may be used, the exact location of the lights may vary, and different types of lights can be used, such as LED's.

Trailer 101 preferably includes one or more attachment points 123 and 124. Attachment points 123, 124 are shown in certain positions in the figures, but it should be appreciated that attachment points 123, 124 may be located at a variety of desired locations on trailer 101 to achieve a variety of tasks. For example, attachment points 123, 124 may be used to tether livestock to trailer 101 while moving livestock in and around trailer 101. Additionally, attachment points 123, 124 may be used to attach trailer 101 to a corral system, chute system, gate, or other pieces of equipment.

Figure 3:
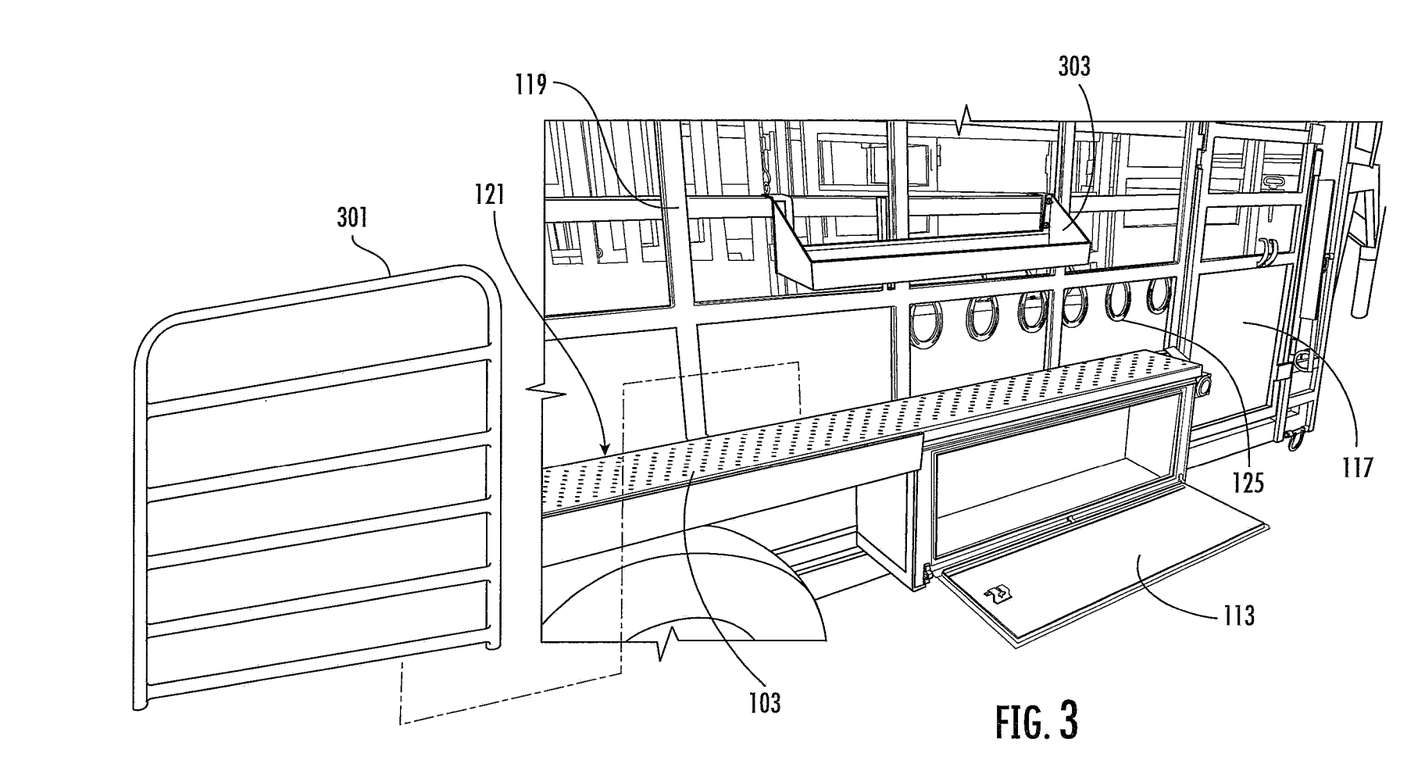
FIG. 3 is a partial perspective view of the trailer for working livestock of FIG. 1.

Referring now also to FIG. 3 in the drawings, an enlarged view of side wall 119 of trailer 101 is illustrated. A fence 301 is shown being stored within the gap 121. As described earlier, it should be appreciated that fence 301 may be a portion of a gate, or other similar pieces of equipment instead. As shown in FIG. 3, storage cabinet 113 may be used to store one or more removable custom shelves 303. Shelf 303 is preferably configured to be stored within storage cabinet 113 and to be attached to side wall 119. With this unique configuration, a worker may store tools on or in shelf 303 within storage cabinet 113, and then attach shelf 303 to either the inside or outside of side wall 119, while the worker is tending to an animal either inside or outside of trailer 101. Shelf 303 may be configured to sit on the floor storage cabinet 113, or to hang in storage cabinet 113, such that multiple levels of storage are present within storage cabinet 113. While this illustration provides examples of what could be done on one side of the trailer, it should be appreciated that the same or similar configurations may be present on the other side of trailer 101, either in addition to, or in place of, the side shown in FIG. 3.

Referring now also to FIG. 4 in the drawings, an enlarged view of storage cabinet 213 of trailer 101 is illustrated. Storage cabinet 213 includes an air tank 401 and a battery 403. Air tank 401 and battery 403 can be used to operate multiple portions and components of trailer 101, such as a lift system 212, the various doors and gates of trailer 101, and lights 112. While only air tank 401 and battery 403 are illustrated here, it will be appreciated that additional systems or other systems may be used or stored in storage cabinet 213. For example, a solar panel may be placed somewhere on trailer 101 and fed into a battery storage system that may or may not be contained in one of the storage cabinets. Additionally, portions of a hydraulic or pneumatic system, such as cables, hoses, and air compressors, may also be stored in storage cabinet 213.

A pole 409, which can be used for working the livestock in trailer 101, may be stored on trailer 101. Pole 409 is configured to fit onto peg 407 and through opening 405 for storage purposes. Pole 409 is preferably configured to fit through openings 125, so that livestock can be maneuvered with pole 409 from the outside of trailer 101. While openings 125 and opening 405 are illustrated as being horseshoe shaped, it should be understood that alternative shapes and sizes of openings may be used in alternative embodiments of the present application.

All of the systems in trailer 101 may be operated by one or more control systems and/or control panels located on trailer 101 and/or in a towing vehicle, or may be operated remotely by wireless control, such as by a smart phone application.

Referring now also to FIG. 5 in the drawings, an enlarged view of handles 107 and latch 109 of trailer 101 are illustrated. Handles 107 each include a rotatable handle 501, a magnet 503, and a leg 505. A pocket 507 is configured such that legs 505 can be removably held within pocket 507, such that the legs are secured within the pocket 507. According to the preferred embodiment, the rotatable handle 501 is configured such that a person may lift up on the handle 501, and thereby lift legs 505 out of pocket 507. Magnet 503 is configured such that rotatable handle 501 may be removably held securely to the rear doors 105. While a magnet is used in the illustrated embodiment, it should be appreciated that a number of different fasteners may be used to secure handles 107 to doors 105.

In the preferred embodiment, latch 109 includes a pin 509, a latch handle 510, a latch pocket 511, and a latch body 512. Latch 109 is configured such that when pin 509 is removed, latch handle 510 may be pulled to the side, such that latch body 512 is removed from latch pocket 511. While latch 109 described herein takes the configuration illustrated as a preferred embodiment, it should be appreciated that there is a multitude of various latch systems that may be used to achieve the same redundant security of rear doors 105 as is presented here.

The redundant system illustrated in FIG. 5 is configured for a high level of security in keeping rear doors 105 closed. As illustrated, a person would have to remove pin 509, release latch body 512 from latch pocket 511, and then remove leg 505 from pocket 507 in order to open rear doors 105. While the level of redundancy presented is preferred, it should be appreciated that less or more elements may be used in alternative embodiments of security for rear doors 105.

Figure 6:
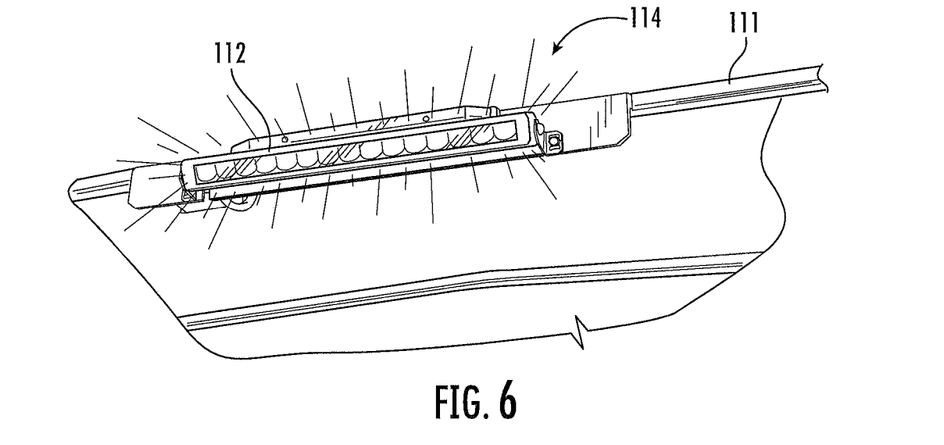
FIG. 6 is a partial perspective view of the trailer for working livestock of FIG. 1.

Referring now also to FIG. 6 in the drawings, a light system 114 of trailer 101 is illustrated. Light system 114 includes at least lights 112, which may be one or more strips of lights or light bars coupled to trailer 101. However, it should be understood that various forms of lights may be placed at various locations of trailer 101, as described earlier. In addition, lights 112 may be removable from trailer 101, so that a user may use lights 112 at various locations in and around trailer 101.

Figure 7:
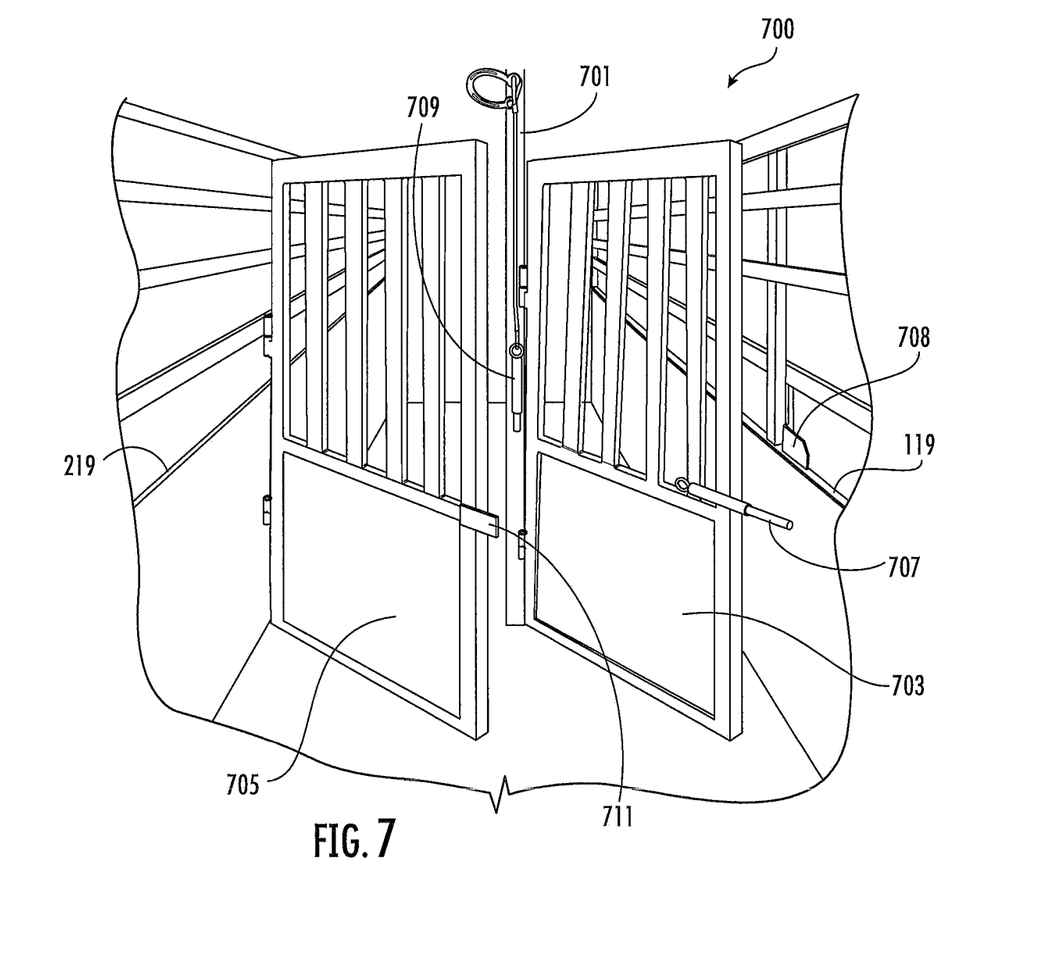
FIG. 7 is a partial perspective view of the trailer for working livestock of FIG. 1.

Referring now also to FIG. 7 in the drawings, an interior portion of trailer 101 is illustrated. Trailer 101 includes a unique adjustable partition system 700. Partition system 700 is shown and described in FIGS. 7-16. A support pole 701 is located near the center of trailer 101. Fixed pole 701 includes a latch 709, which is configured for securing a door 705 ion a closed position. Door 705 includes an arm 711, which is configured such that latch 709 may block arm 711, thereby holding door 705 in a closed position. In the preferred embodiment, door 705 is hinged on side wall 219, such that door 705 opens towards rear doors 105 of trailer 101. A door 703 is adjacent to door 705, such that the entire width between side wall 119 and side wall 219 is covered when doors 703, 705 are in the closed positions. Door 703 includes a pin 707, which is configured to be held securely by plate 708 when door 703 is in a closed position. Plate 708 is disposed on side wall 119. Door 703 is preferably hinged on support pole 701, such that door 703 opens toward rear doors 105 of trailer 101. While the preferred embodiment of the present application includes the configuration illustrated in FIG. 7, it should be appreciated that other hinging positions, methods of securing doors closed, and door positions may be used. For example, one door could be used in place of two, that door being hinged on one side, or one or more roll-up doors may be utilized. Additionally, the interior of trailer 101 could have doors hinged on both side walls, such that the doors open away from each other. Many other forms of door configuration and fastening, not limited to the examples provided herein, may be used to achieve the desired limitations of the elements of FIG. 7.

Figure 8:
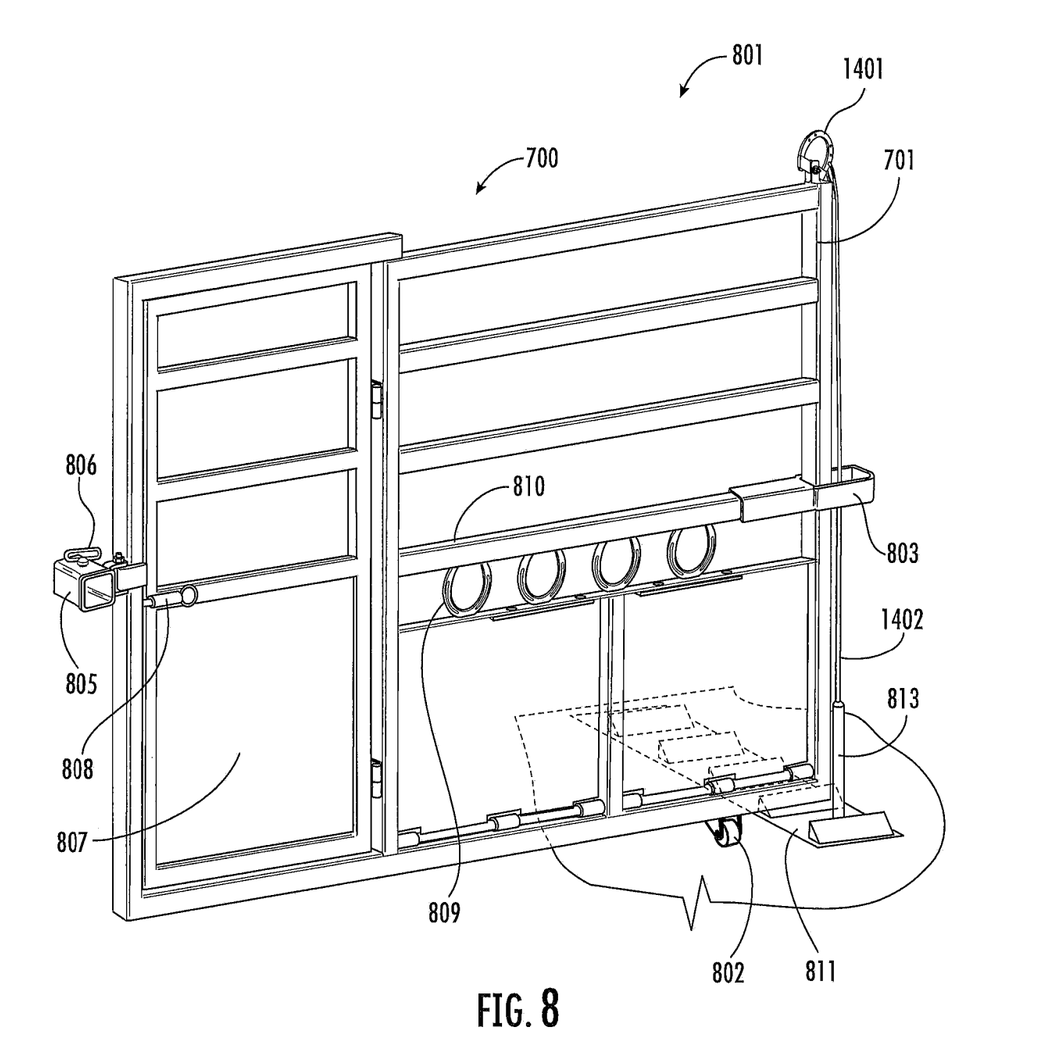
FIG. 8 is a partial perspective view of the trailer for working livestock of FIG. 1.

Referring now also to FIG. 8 in the drawings, an interior partition 801 of trailer 101 is illustrated. Partition 801 includes a door 807, a first sleeve 803, a second sleeve 805, openings 809, and a wheel 802. Partition 801 is configured such that partition 801 can be temporarily fixed in different positions inside trailer 101, depending upon the desired functionality (see also FIGS. 9-11). First sleeve 803 is configured to connect to support pole 701, such that partition 801 is secured to an interior portion of trailer 101. First sleeve 803 translates along a rail 810 so that partition 801 may stay attached to pole 701 as partition 801 is adjusted diagonally within trailer 101 (see FIG. 13). Such diagonal adjustment (see FIG. 11) requires that the length of partition 801 be adjusted.

Second sleeve 805 is configured to attach to a rail system 900 on or near a front end of trailer 101. It is preferred that second sleeve 805 includes a pin 806, configured to removably secure second sleeve 805 to rail system 900 of trailer 101. Door 807 includes a latch 808 to secure door 807 in a closed position. It will be appreciated that latch 808 and pin 806 may vary in shape and size, while maintaining the intended functionality of the present application. Openings 809 are configured for use with pole 409 (see also FIG. 15). Wheel 802 aids in maneuvering partition 801 within the interior of trailer 101. It should be understood that fewer or additional features may be present as part of a partition in an alternative embodiment of the present application.

The unique configuration of partition 801 of the present application allows for partition 801 to be maneuvered in ways not possible in conventional trailers. Partition 801 can be maneuvered laterally from one side wall 119 to opposing side wall 219, allowing for complete maneuverability within the interior of trailer 101. Additionally, partition 801 may be pivoted, such that a diagonal partition is created relative to walls 119, 219 of trailer 101.

Trailer 101 includes tracks 811 on the floor of the interior of trailer 101. Tracks 811 may be configured in any manner designed to aid in directing livestock. Tracks 811 allow partition 801 to be locked into a selected position. For example, tracks 811 may be closer or farther apart, depending on the size of the animals being put into the trailer. Additionally, the tracks may need to vary in height, based on the size of an animal's legs and feet/hooves.

Figure 9:
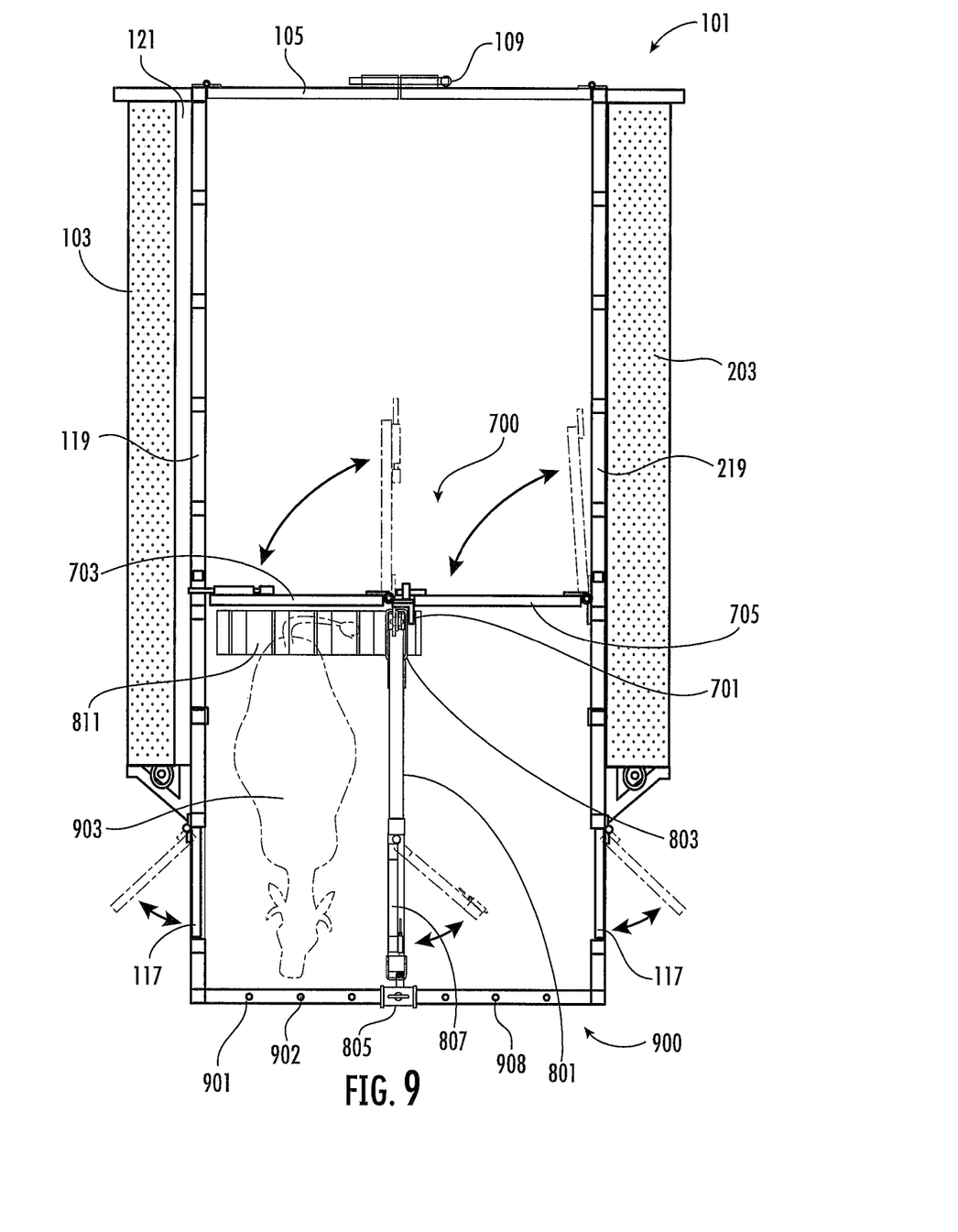
FIG. 9 is a top view of the trailer for working livestock of FIG. 1.

Referring now also to FIG. 9 in the drawings, a top view of trailer 101 is illustrated. FIG. 9 includes many features previously described herein, while including additional details for further clarity. Trailer 101 includes a front rail 901 and front rail holes 902. The outline of an animal 903 shows one intended use of trailer 101. It will be appreciated that animal 903 could be a number of different livestock animals that need to be tended to by a farmer or vet, for example. Front rail 901 is preferably disposed near the front end of trailer 101. Front rail 901 includes front rail holes 902, configured to receive pin 806, whereby partition 801 is attached to front rail 901. FIG. 9 also illustrates the intended closed and open positions of side doors 117, doors 703, 705, and door 807. The solid lines illustrate the closed position of each door, while the dashed lines illustrate an open position of each door. It will be appreciated that all of the doors may be configured to attach or operate in different positions.

Figure 10:
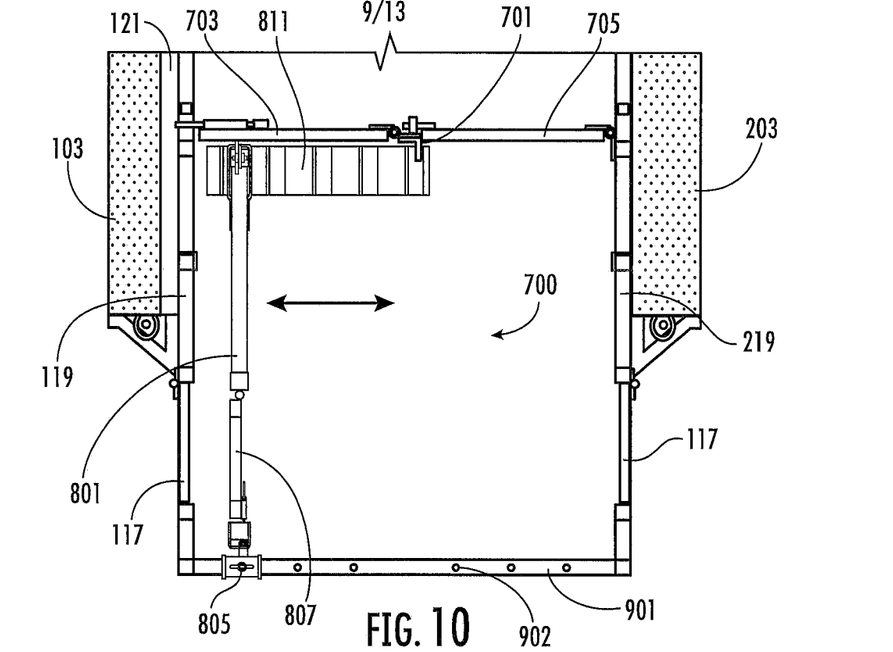
FIG. 10 is a partial top view of the trailer for working livestock of FIG. 1.
Figure 11:
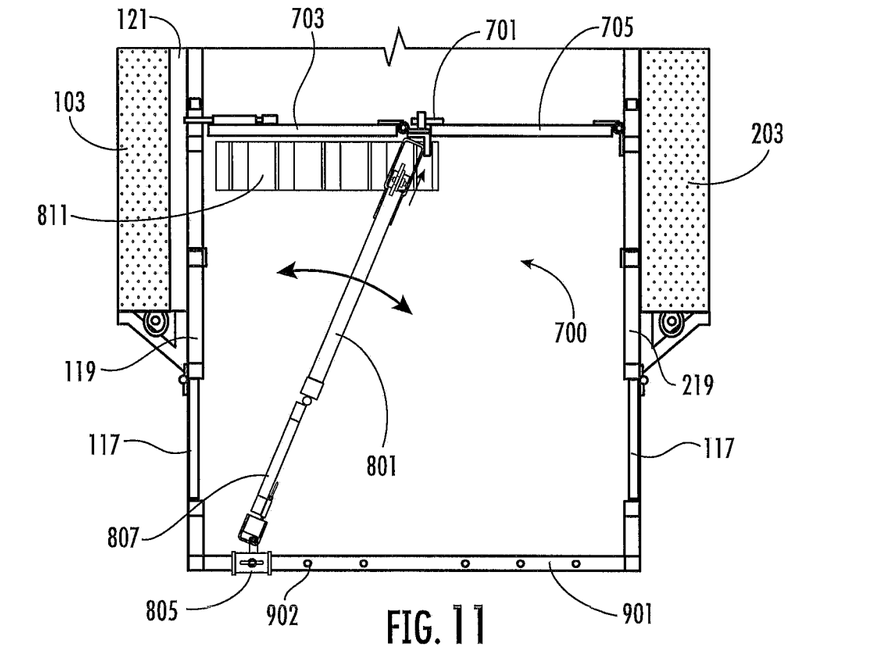
FIG. 11 is a partial top view of the trailer for working livestock of FIG. 1.

Referring now also to FIGS. 10 and 11 in the drawings, a partial top view of trailer 101 is illustrated. FIGS. 10 and 11 illustrate various positions of partition 801. It will be appreciated that partition 801 can be connected in other various positions relative to doors 703, 705 and front rail 901, beyond what is illustrated in the Figures presented herein.

Figure 12:
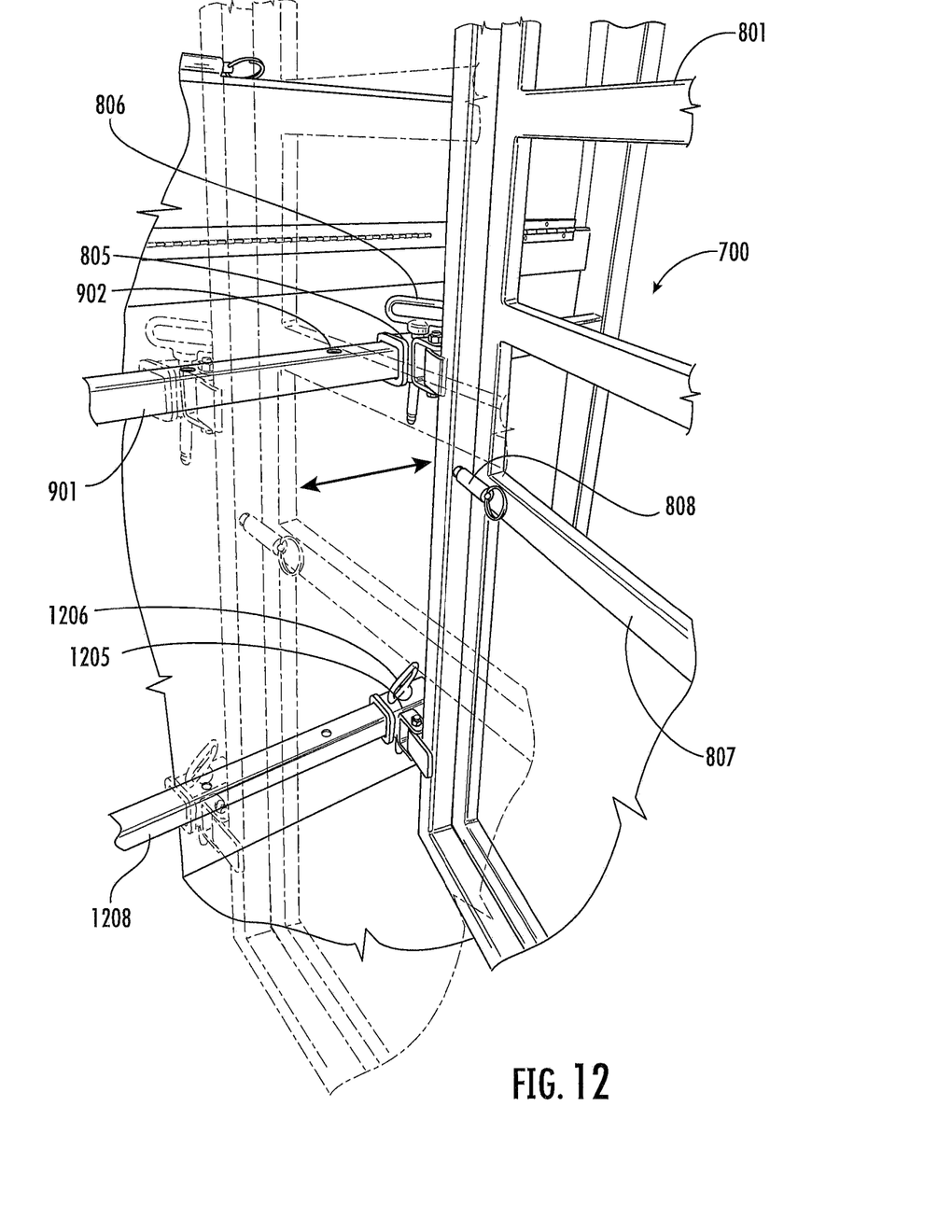
FIG. 12 is a partial perspective view of the trailer for working livestock of FIG. 1.

Referring now also to FIG. 12 in the drawings, an enlarged view of partition 801 showing the connection of partition 801 to front rail 901 is illustrated. Partition 801 may optionally have additional attachment points, such as third sleeve 1205, pin 1206, and second front rail 1208. FIG. 12 illustrates multiple positions of partition 801 relative to front rail 901. The solid lines indicate one possible position of partition 801, while the dashed lines indicate a second possible position of partition 801. While only two positions for partition 801 are shown in FIG. 12, it will be appreciated that multiple other positions are possible using the same embodiment of the present application.

Figure 13:
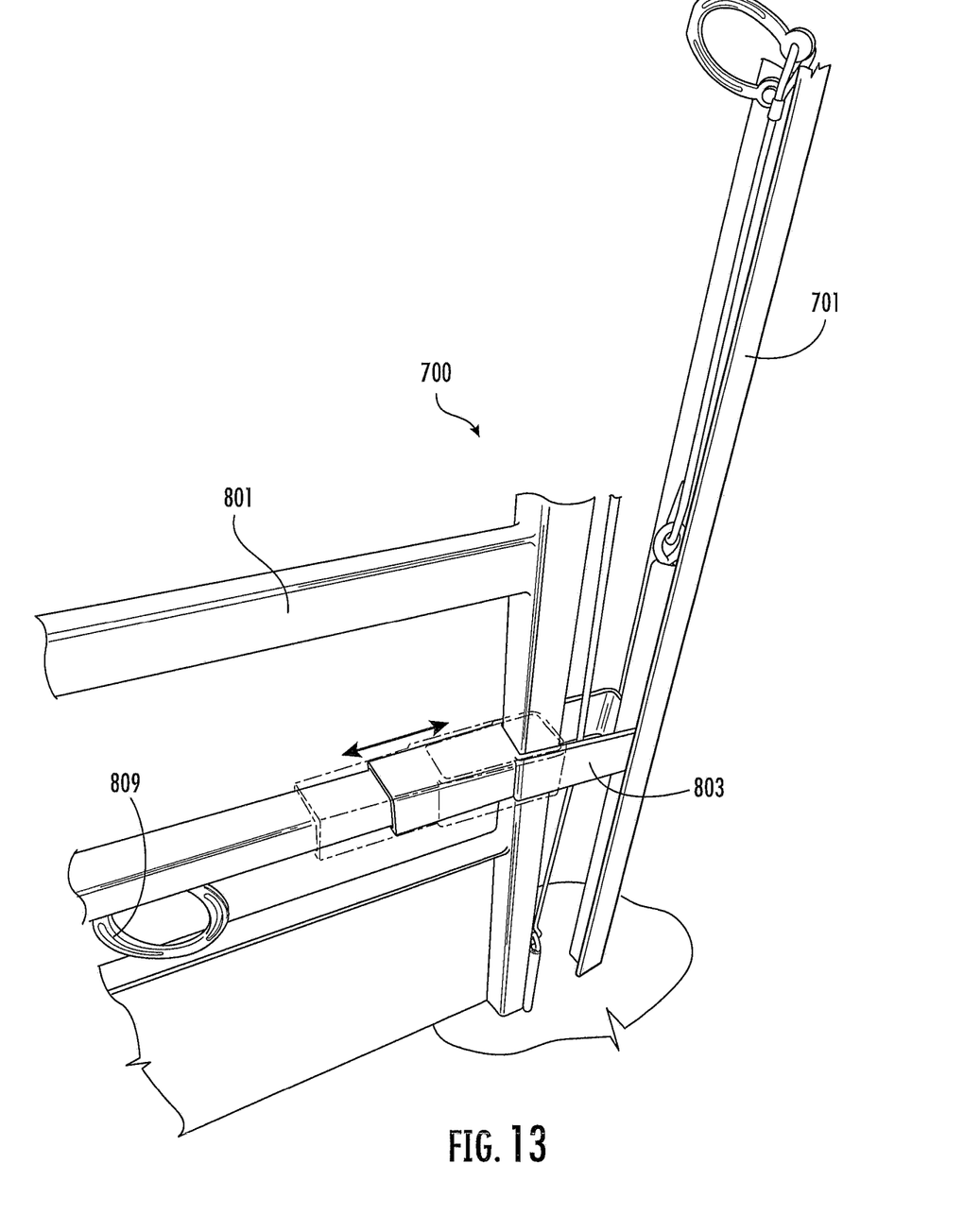
FIG. 13 is a partial perspective view of the trailer for working livestock of FIG. 1.

Referring now also to FIG. 13 in the drawings, an enlarged view of the connection of partition 801 to support pole 701 is illustrated. The translating feature of first sleeve 803 is illustrated. Because partition 801 may take on various positions within trailer 101, different lengths of partition 801 are required in order to maintain a closed position relative to support pole 701 and front rail 901 (and front rail 1208). Sleeve 803 is configured such that sleeve 803 may translate along partition 801, in order to adjust the end point of the connection. By utilizing this unique configuration, partition 801 may be used at either straight or angled positions within trailer 101, rather than having to use multiple partitions if slightly different lengths were needed. It should be appreciated that various forms of adjustable connecting points may be used, while maintaining the desired functionality of the present application.

Figure 14:
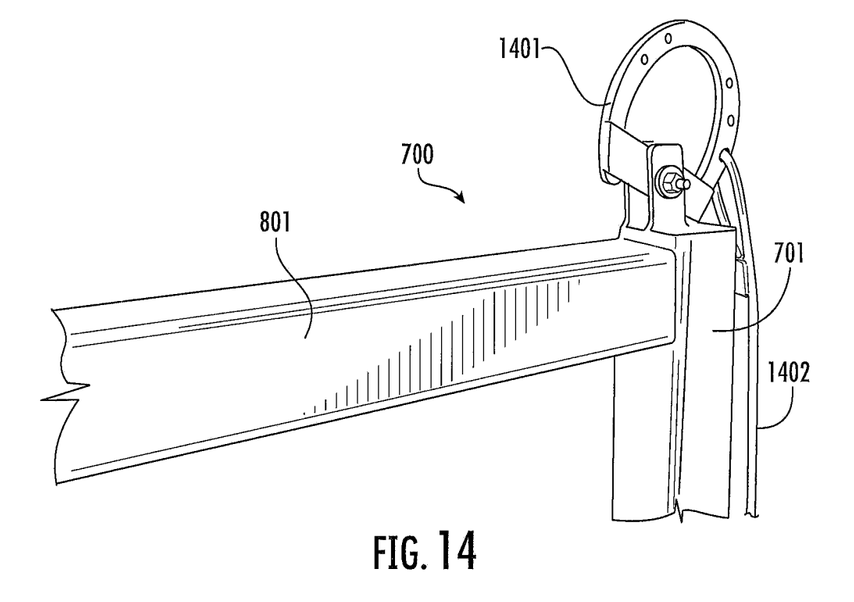
FIG. 14 is a partial perspective view of the trailer for working livestock of FIG. 1.

Referring now also to FIG. 14 in the drawings, another enlarged view of the connection point between partition 801 and support pole 701 is illustrated. A handle 1401 is connected via an extension rod 1402 to a latch 813. By operating handle 1401, a user can release latch 813 from tracks 811, so that position of support pole 701 may be changed. It should be appreciated that handle 1401 and latch 813 may take on various shapes and sizes, as long as handle 1401 and latch 813 serve to aid in fixing the position of support pole 701.

Figure 15:
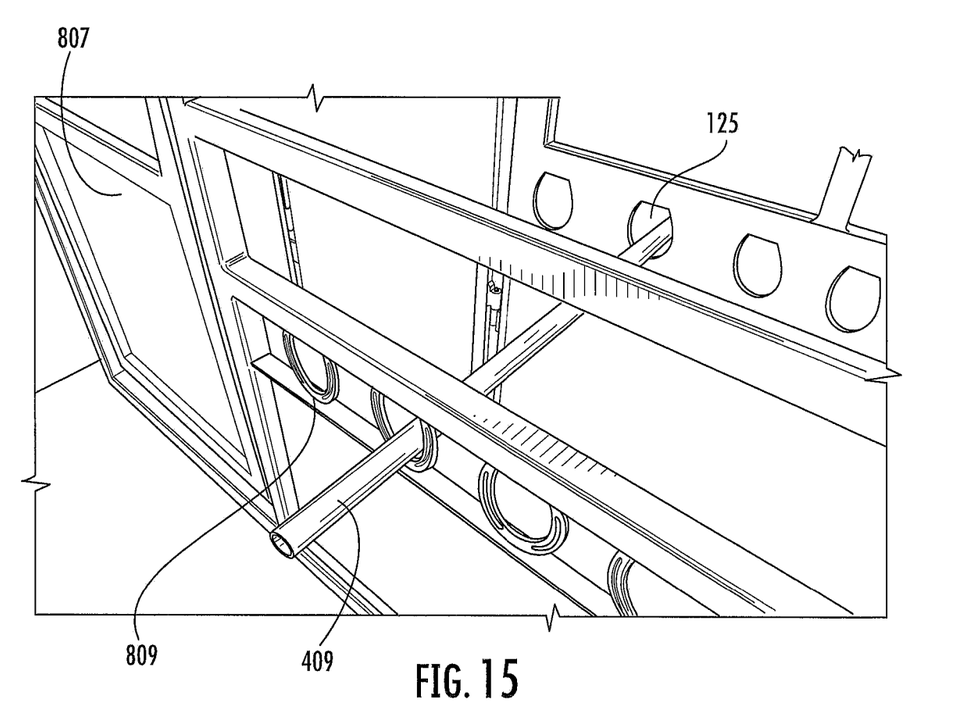
FIG. 15 is a partial perspective view of the trailer for working livestock of FIG. 1.

Referring now also to FIG. 15 in the drawings, an enlarged view of partition 801 within the interior of trailer 101 is illustrated. As is shown, a user may insert pole 409 through opening 125 and into the interior of trailer 101, and optionally through opening 809, in order to work on livestock in trailer 101 or to block off certain portions of trailer 101. For example, additional tools may be used to work the livestock in trailer 101, while pole 409 is being used to direct and block off livestock from certain portions of the interior of trailer 101.

Figure 16:
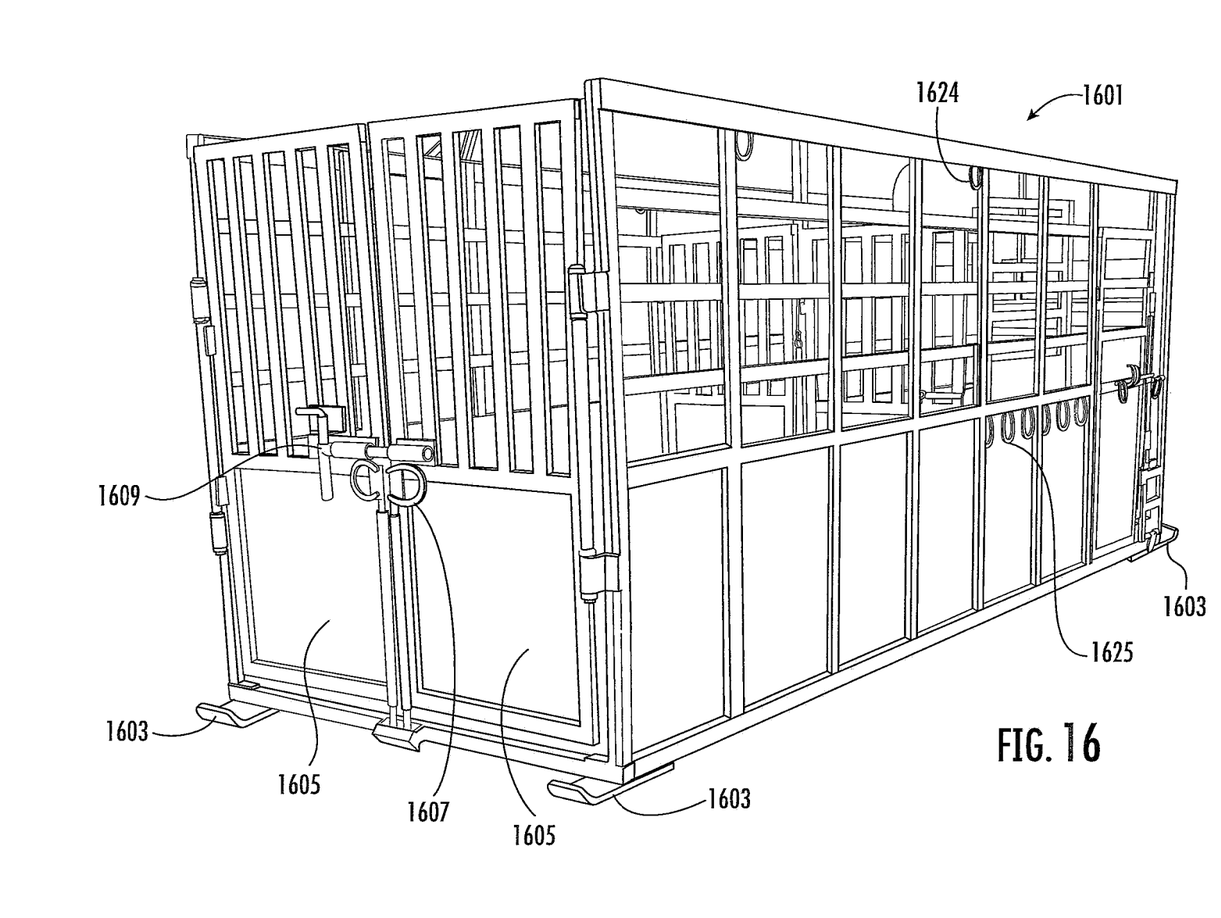
FIG. 16 is an alternative embodiment of a trailer for working livestock according to the present application.

Referring now also to FIG. 16 in the drawings, an alternative embodiment of the trailer for working livestock according to the present application is illustrated. In this embodiment, a trailer enclosure 1601 is configured an "insert" component that may be inserted and/or installed in an existing trailer. Rather than being configured as a full trailer, with axles, wheels, tongue, etc., trailer enclosure 1601 is configured for use with an existing trailer or similar piece of equipment. Trailer enclosure 1601 includes many of the same features as trailer 101, such as rear doors 1605, handles 1607, latch 1609, openings 1625, and attachment brackets 1624. In particular, trailer enclosure 1601 includes the full working partition 801 and all of the accompanying components. However, rather than including the trailer body of the preferred embodiment, enclosure 1601 includes skids or feet 1603. Skids 1603 are configured such that insertion into or onto an existing trailer is made easier. While skids 1603 are shown as runners, it should be appreciated that various embodiments may use other designs, such as wheels, casters, pipes, or similar elements.

It will be appreciated that trailer enclosure 1601 may be used as a stand-alone unit for use in working livestock. For example, trailer enclosure 1602 may be used in a field, barn, or veterinary clinic. A user can move trailer enclosure 1602 to various areas on his property to treat and work various livestock, without having to load the livestock into a trailer and transport them to a corral or other location. Trailer enclosure 1601 may be loaded into an existing livestock trailer and secured to the walls of the trailer with attachment brackets 1624, or trailer enclosure may be loaded onto a flatbed trailer and secured to the deck of the trailer. This makes it possible for a user to convert an existing livestock trailer into a trailer for working livestock.

Trailer 101 and trailer enclosure 1601 provide significant advantages, particularly to users who must work livestock single-handedly. With trailer 101 and enclosure 1601, a single user can work many heads of livestock without having to leave his position inside the trailer.

While FIGS. 1-16 represent the present invention as having specific wall and door designs, it should be appreciated that the walls are not required to have the same design as illustrated. For example, larger portions of the front, side, and rear walls may be enclosed by a solid panel type configuration or a solid surface. Additionally, the walls may include less solid portions than shown. For example, the entire portion may include more gate/fence-like designs, similar to the top half of the trailer as shown in the Figures. The interior doors may be full doors or half size. The doors may be solid or more fence-like, similar to the walls of the trailer.

It is apparent that a trailer for working livestock with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

What is claimed is:

1. A trailer for working livestock, comprising:
   a trailer enclosure, comprising:
      a front wall;
      a pair of opposing side walls;
      a rear wall; and
      a floor; and
   a partition system disposed within the trailer enclosure, the partition system comprising:
      a support pole;
      a front rail system; and
      a movable partition having a first sleeve and a second sleeve;
      whereby the support pole and the front rail system define opposing ends of the partition system;
      wherein the second sleeve is configured for connection to the front rail system and the first sleeve is configured for variable connection to the support pole, such that a secure connection is maintained throughout a variety of movable partition positions;
      wherein the position of the support pole may be adjusted and secured to a plurality of points across the width of the trailer, including to a plurality of securement points on the floor, and the second sleeve is configured to be slidingly manipulated along the front rail system, such that the partition system may be securely positioned at a plurality of angles; and
      wherein the position of the support pole may be adjusted without disengagement of the connection between the movable partition and the support pole.

2. The trailer for working livestock of claim 1, further comprising:
   a track system disposed on the floor of the trailer enclosure for maintaining the position of the support pole.

3. The trailer for working livestock of claim 2, further comprising:
   a latch system for securing the position of the support pole relative to the track system.

4. The trailer for working livestock of claim 1, further comprising:
   at least one door carried by the movable partition.

5. The trailer for working livestock of claim 1, further comprising:
   a lift system configured for raising and lowering the floor of the trailer enclosure.

6. The trailer for working livestock of claim 5, wherein the lift system is an airbag system.

7. The trailer for working livestock of claim 1, further comprising:
a storage cabinet disposed on an external surface of at least one of the side walls.

8. The trailer for working livestock of claim 1, further comprising:
at least one side door on at least one of the opposing side walls.

9. The trailer for working livestock of claim 1, further comprising:
at least one side rail extending along the length of the trailer on an exterior side of one of the side walls.

10. The trailer for working livestock of claim 9, further comprising:
an anti-slip treatment disposed on a top surface of the at least one side rail.

11. The trailer for working livestock of claim 1, further comprising:
a lighting system.

12. The trailer for working livestock of claim 1, further comprising:
a hydraulic system configured to control the operation of the trailer.

13. An enclosure for working livestock, comprising:
a front wall;
a pair of opposing side walls;
a rear wall;
a floor; and
a partition system disposed within the enclosure, the partition system comprising:
a support pole;
a front rail system; and
a movable partition having a first sleeve and a second sleeve;
whereby the support pole and the front rail system define opposing ends of the partition system;
wherein the second sleeve is configured for connection to the front rail system and the first sleeve is configured for variable connection to the support pole, such that a secure connection is maintained throughout a variety of movable partition positions;
wherein the position of the support pole may be adjusted and secured across the width of the enclosure, including to a plurality of securement points on the floor, and the second sleeve is configured to be slidingly manipulated along the front rail system, such that the partition system may be securely positioned at a plurality of angles; and
wherein the position of the support pole may be adjusted without disengagement of the connection between the movable partition and the support pole.

14. The enclosure for working livestock of claim 13, further comprising:
a track system disposed on the floor for maintaining the position of the support pole.

15. The enclosure for working livestock of claim 14, further comprising:
a latch system for securing the position of the support pole relative to the track system.

16. The enclosure for working livestock of claim 13, further comprising:
at least one door carried by the movable partition.

17. The enclosure for working livestock of claim 13, further comprising:
skids coupled to the floor to assist in moving the enclosure.

18. The enclosure for working livestock of claim 13, further comprising:
at least one side door on at least one of the opposing side walls.

19. The enclosure for working livestock of claim 13, further comprising:
a lighting system.

20. The enclosure for working livestock of claim 13, further comprising:
one or more attachment brackets for securing the enclosure to the inside of an existing trailer.

* * * * *